(12) United States Patent
Anderson et al.

(10) Patent No.: US 7,454,829 B2
(45) Date of Patent: Nov. 25, 2008

(54) CABLE SORTING THREADER AND LABELING TOOL

(76) Inventors: Bruce Anderson, 6711 Lee Hwy., Suite M-3, Arlington, VA (US) 22205; Gregory Lindholm, 6711 Lee Hwy., Suite M-3, Arlington, VA (US) 22205

( * ) Notice: Subject to any disclaimer, the term of this patent is extended or adjusted under 35 U.S.C. 154(b) by 300 days.

(21) Appl. No.: 11/206,133

(22) Filed: Aug. 18, 2005

(65) Prior Publication Data

US 2006/0085974 A1 Apr. 27, 2006

Related U.S. Application Data

(63) Continuation-in-part of application No. PCT/US2005/020122, filed on Jun. 8, 2005.

(60) Provisional application No. 60/620,664, filed on Oct. 22, 2004.

(51) Int. Cl.
*B23P 19/00* (2006.01)

(52) U.S. Cl. ............................. 29/748; 29/721; 29/742; 29/748; 29/753; 29/755

(58) Field of Classification Search .................. 29/748, 29/755, 742, 721, 753, 729; 242/447.2, 447.3, 242/447.5, 174, 440, 538; 81/326, 801, 651.1; 140/112, 113
See application file for complete search history.

(56) References Cited

U.S. PATENT DOCUMENTS

| | | | |
|---|---|---|---|
| 2,155,769 A | 4/1939 | Porter | |
| 2,705,114 A | 3/1955 | Worsham | |
| 2,749,670 A | 6/1956 | Lewis | |
| 4,391,422 A | 7/1983 | McDonald | |
| 4,530,472 A | 7/1985 | Voss et al. | |
| 4,537,106 A * | 8/1985 | Rider | 83/650 |
| 4,564,152 A | 1/1986 | Herriage | |
| 4,596,072 A * | 6/1986 | Shields | 29/861 |
| 4,611,645 A | 9/1986 | Whisnant | |
| 5,052,449 A * | 10/1991 | Fukuda et al. | 140/93 R |
| 5,308,012 A | 5/1994 | Fuller | |
| 5,464,193 A | 11/1995 | Wrate | |
| 5,509,671 A | 4/1996 | Campbell | |
| 5,595,355 A * | 1/1997 | Haines | 242/470 |
| 5,779,229 A | 7/1998 | Lirette | |
| 6,003,842 A | 12/1999 | Hug | |
| 6,125,532 A * | 10/2000 | Takada | 29/857 |
| 6,130,975 A | 10/2000 | Eyres | |
| 6,267,355 B1 | 7/2001 | Fletcher | |
| 6,416,010 B2 | 7/2002 | Fletcher | |
| 6,940,018 B1 | 9/2005 | Dewhirst | |

* cited by examiner

*Primary Examiner*—David P. Bryant
*Assistant Examiner*—Tai Nguyen
(74) *Attorney, Agent, or Firm*—Young & Thompson (57) ABSTRACT

A structured cabling tool includes a lower frame base that supports cable axles, the tool being extended in a ready for use condition and compacted in a ready for transport condition; frame arms supported by the lower frame base, the frame arms fixable upright orthogonal to the lower frame base in the ready for use condition and coextensive with the lower frame in the ready for transport condition; a cable sorting threader supported between the frame arms; and a revolvable tape segmenting spindle supported by the frame arms below the cable sorting threader.

19 Claims, 10 Drawing Sheets

CABLE SORTING THREADER AND LABELING TOOL

RELATED APPLICATIONS

This application is a continuation-in-part of PCT/US2005/020122 filed on Jun. 8, 2005 and claims priority to U.S. Provisional Application 60/620,664 filed on Oct. 22, 2004.

BACKGROUND OF THE INVENTION

The present invention concerns a system for the continuous deployment of cabling and a tool associated therewith that removes, or at least reduces, cable reel memory (reel set) in deployed structured cable and with efficiencies to save labor hours, material costs, and reduce errors as compared to prior art tools. The tool is advantageously used with structured cable but is not so limited and may be used with electrical cable and other cable such a security cable.

SUMMARY OF THE INVENTION

A first aspect of the present invention concerns a structured cabling system and tool that assists craftsmen with the continuous deployment of structured cabling over long distances to multiple locations so as to enhance the effectiveness of the craftsman in dealing with a large number of cables, while concurrently removing (or reducing) cable reel memory of cable coming off reels or out of cable boxes. Removing cable reel memory advantageously allows the pulled cable to lay flatter in an overhead horizontal run and reduces the length of cable necessary in making a lengthy cable run, making the cable pulling easier and increasing the effective length of the pulled cable.

Another aspect of the present invention concerns a cabling system and tool having a construction providing for craftsmen to systematically organize, measure, identify, and install multiple cables to multiple locations through the co-ordination and identification of numerous, varied cabling types using a tape system that assists in identifying individual cables being used. The labeling and organizing of cables right off the cabling tool avoids errors and improves efficiency.

Yet another aspect of the present invention concerns a cabling system and tool constructed for ease of transportation and assemble at a final job site.

A further aspect of the present invention concerns a cabling system and tool that handles all major types and sizes of structured cabling packaging including multiple size reels and boxes. Improved mounting of the cable reels reduces effort required to pull the cable bundles.

A still further aspect of the invention is system and tool scalable by providing a design allowing cabling tools of various sizes to afford portable tool solutions scaled to the task at hand. The scalable aspect allows for both a smaller hand-carried unit suitable for a "change and reconfigure" job and other small installations, and a larger model suitable for major installation jobs, where both can compact (e.g., folded) into a compact unit suitable for easy transport.

Particular structures that achieve these aspects of the invention are disclosed below. These above noted aspects of the invention are examples and not intended to be limiting, as one of skill will appreciate other advantages of the invention from the following disclosure and the drawing figures.

BRIEF DESCRIPTION OF THE DRAWINGS

FIG. 11 illustrates a compact embodiment of the invention with FIGS. 12-13 illustrating side views of this embodiment.

DESCRIPTION OF THE PREFERRED EMBODIMENTS

The following disclosure applies to the drawing figures generally. Specific references to any individual drawing figure is intended to clarify the related disclosure and is not intended to be limiting.

Figure 1:
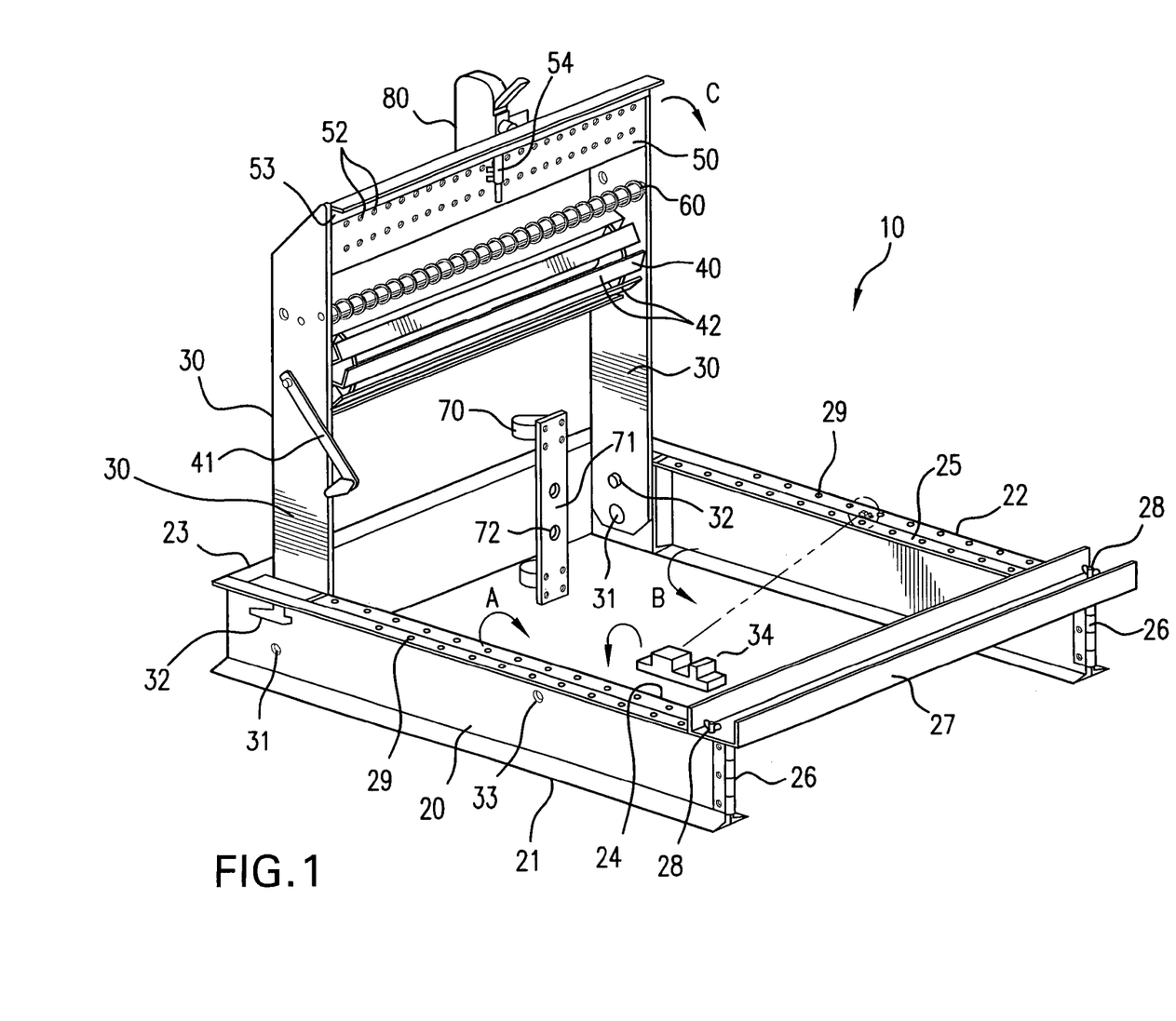
FIG. 1 illustrates an embodiment of the inventive structured cabling tool in a partially assembled condition and near ready use.
Figure 2:
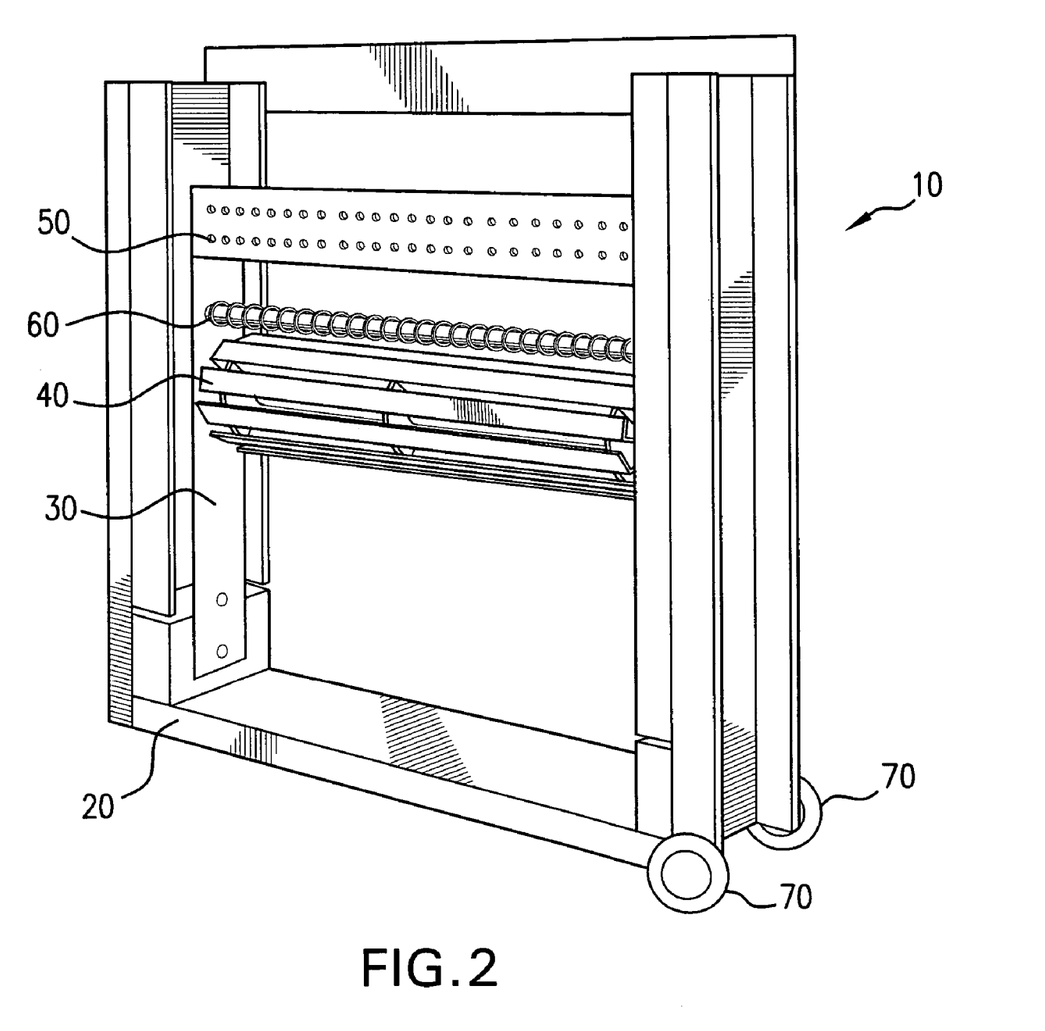
FIG. 2 illustrates an embodiment of the inventive structured cabling tool in a ready to transport condition.
Figure 3:
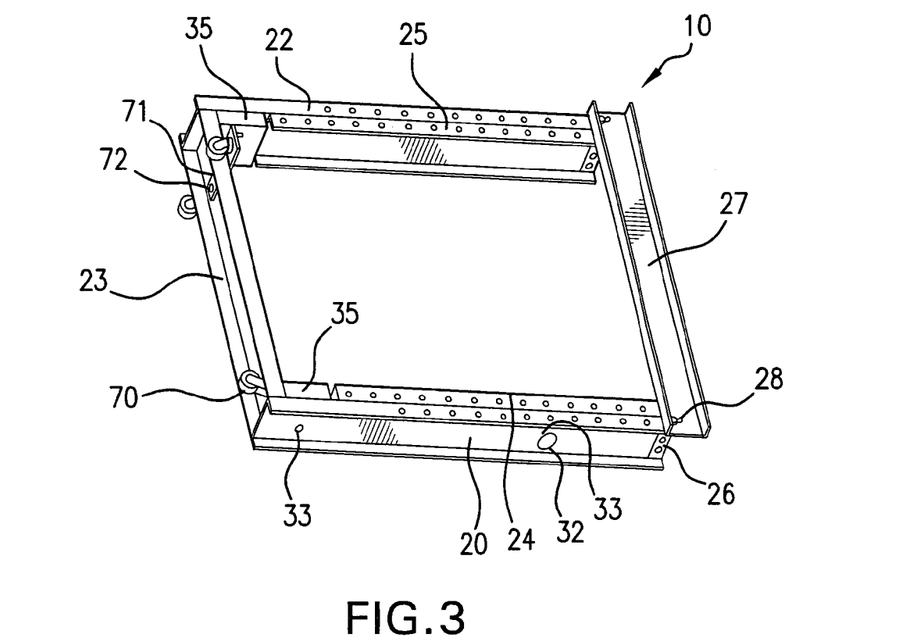
FIG. 3 illustrates another embodiment of the tool frame in the ready to transport condition.
Figure 9:
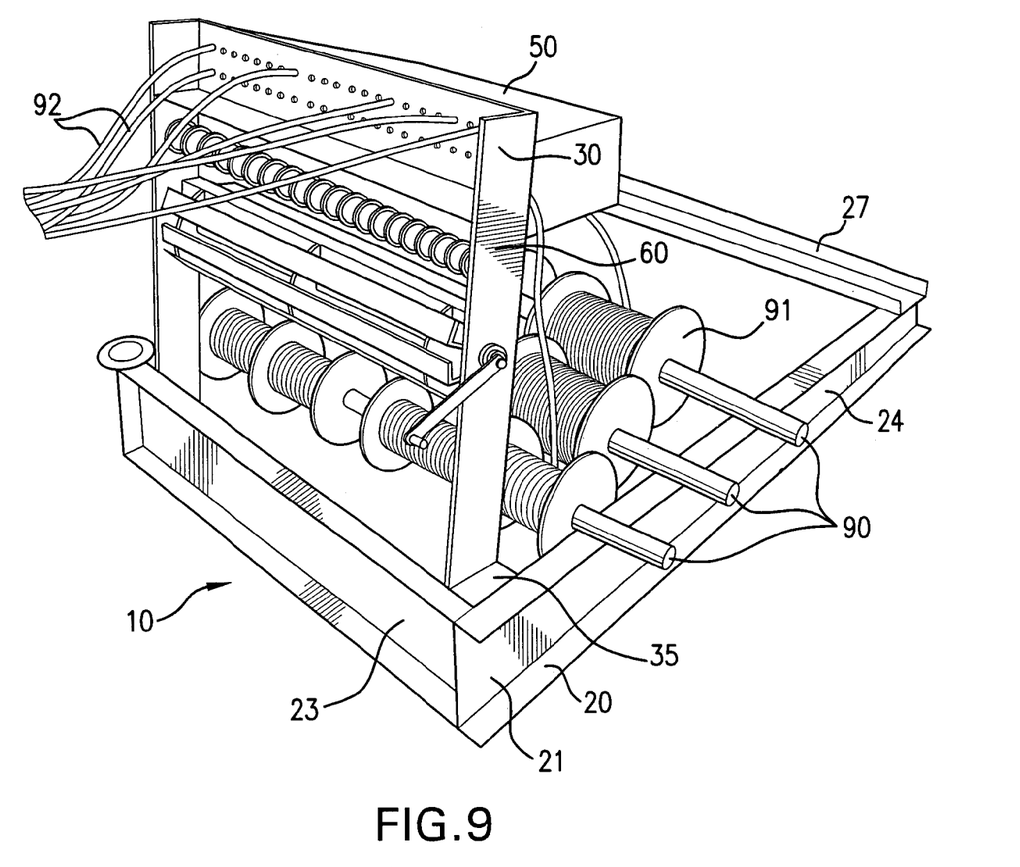
FIG. 9 illustrates the tool in the in ready for use condition with plural cable axles being supported.
Figure 11:
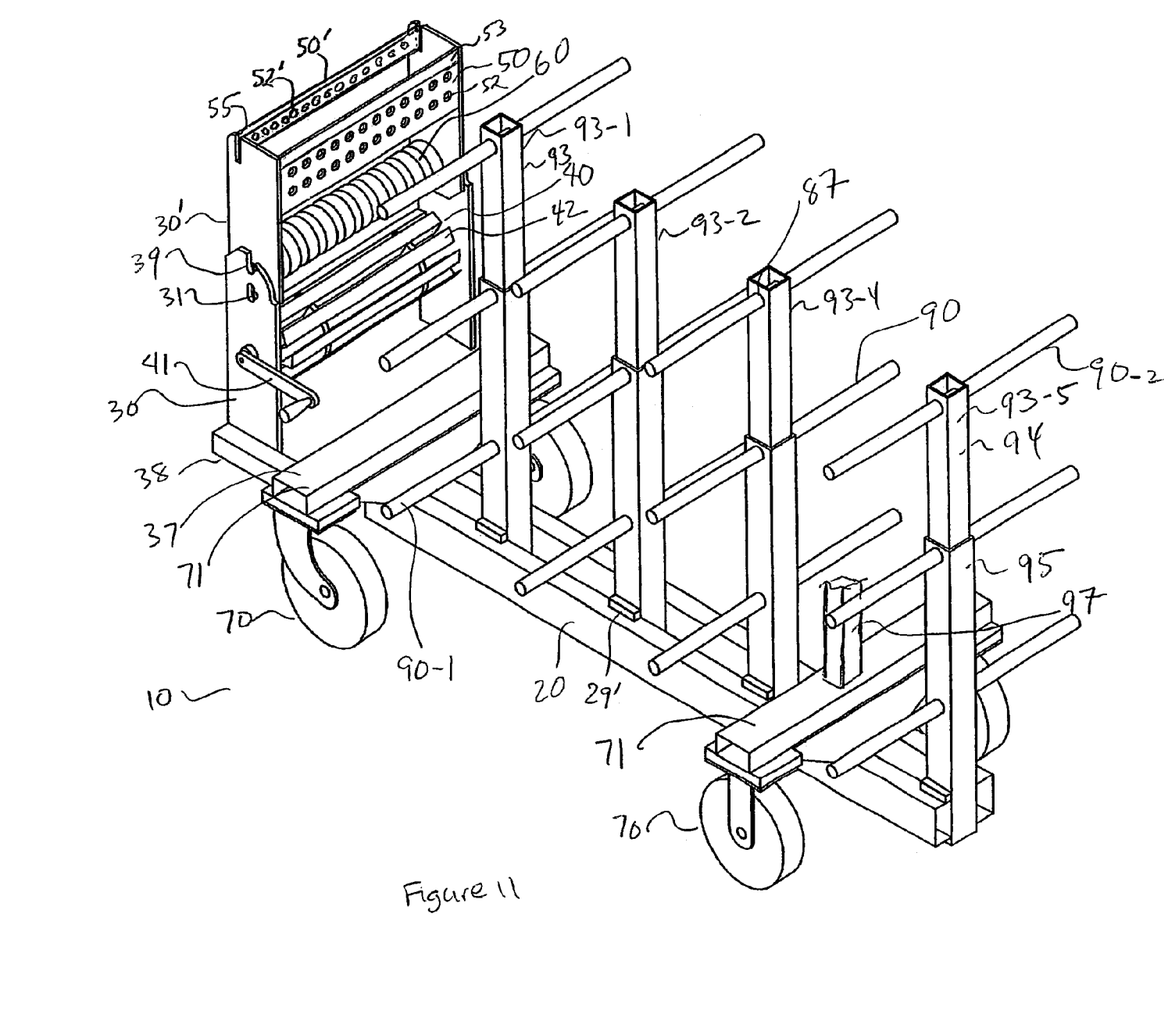

The tool 10 is reconfigurable between two primary conditions: i) ready for use (use condition) and ii) ready for transport (transport condition). In the ready for transport condition the tool is compacted, e.g., to fit through a building doorway. FIGS. 2-3 illustrate a ready to transport condition. FIG. 1 illustrates a near ready for use condition. FIGS. 9 and 11 illustrate ready for use conditions. The ready for use condition may also serve as a limited space use condition. Thus, the below discussed conditions are not limiting as the flexible use of the invention will be clear to those of skill in the art.

Figure 14:
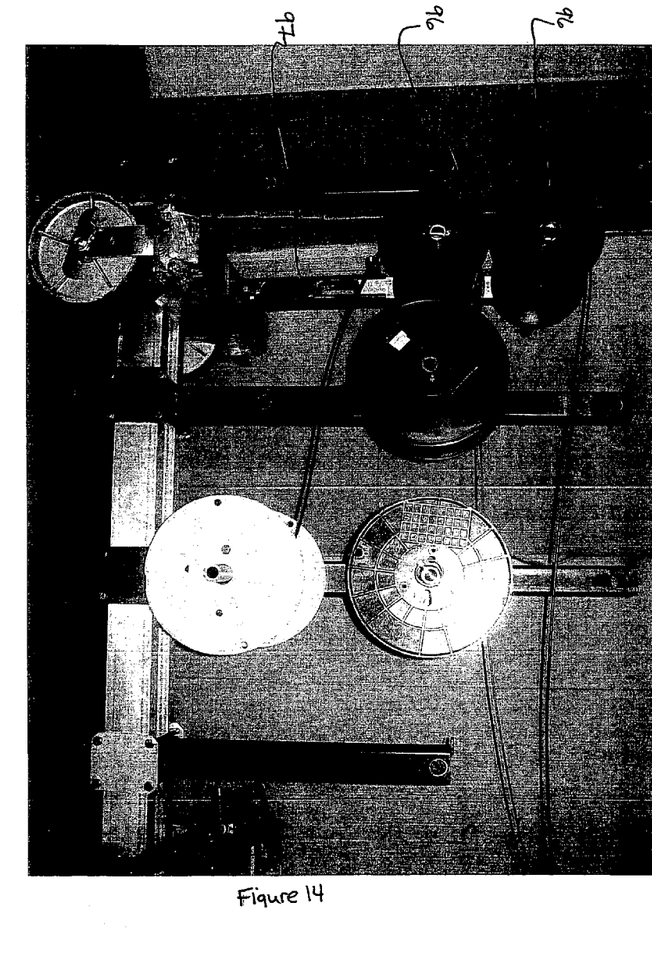
FIGS. 14-15 show mounted reels.
Figure 15:
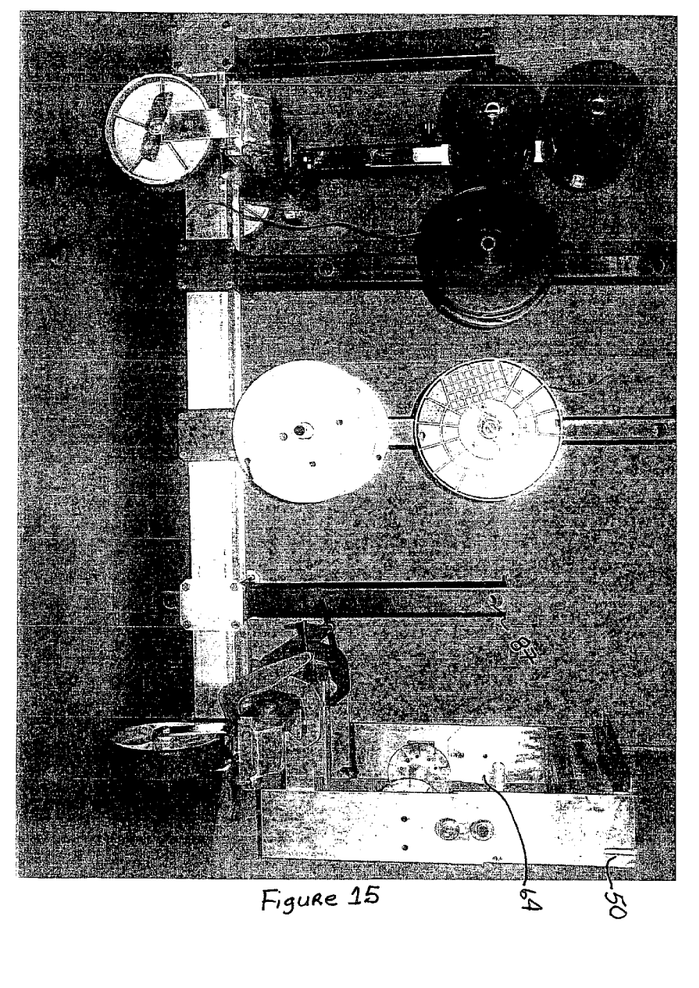

As noted, FIG. 11 illustrates the ready for use condition. FIGS. 14-15 illustrate cable reels 91 mounted on cable axles 90. FIG. 14 further shows cable 92 withdrawn from a forward reel being first routed backward over a rearwardly located pulley 96 and then redirected and routed forward.

Figures 12, 13:
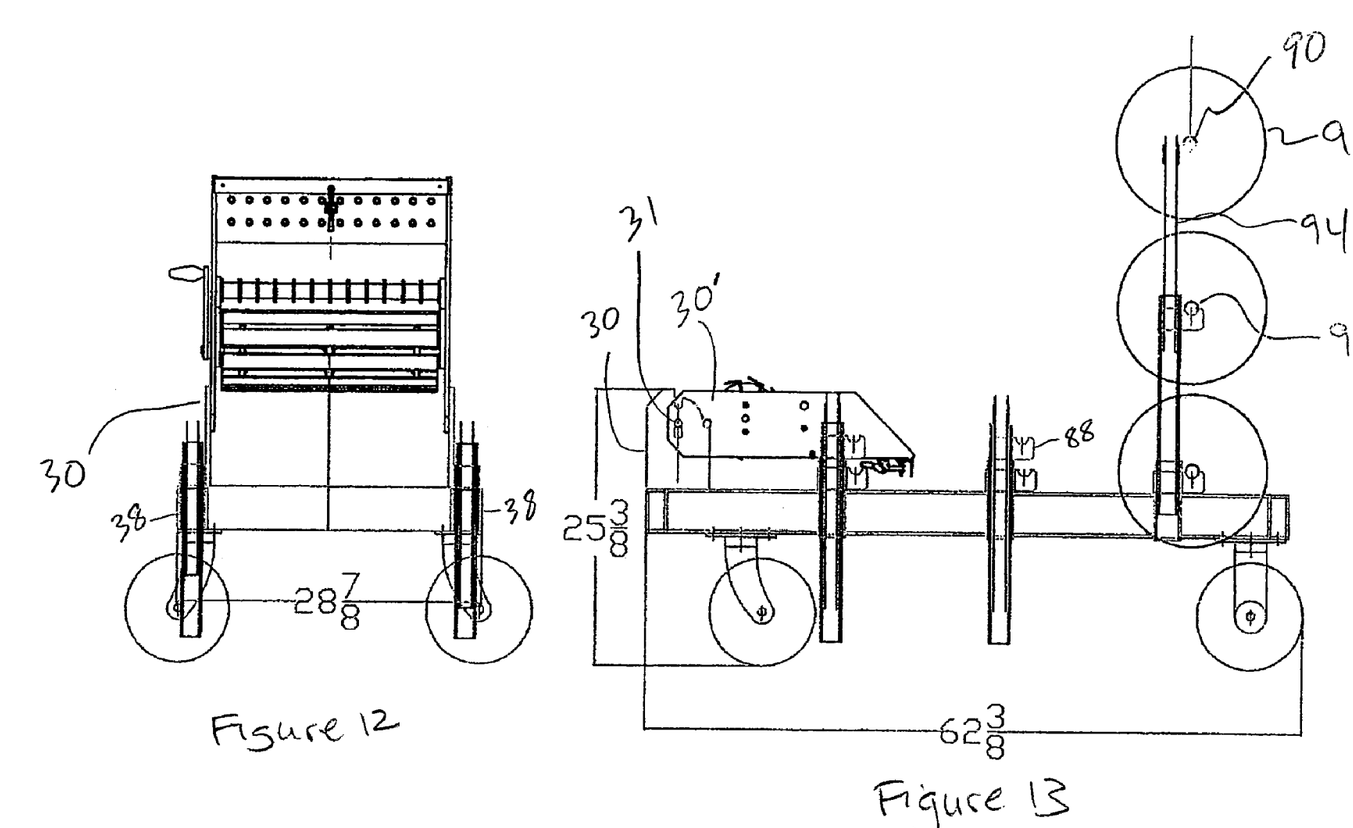

The tool 10 comprises a lower frame 20 which serves as a tool base when the tool 10 is in the ready for use condition. The lower frame 20 supports a pair of frame arms 30, which may be pivoting at least in part. See FIG. 9 showing the tool 10 with the lower frame 20 flat on a floor surface. FIGS. 11-12 show the frame arms 30 extended upright and FIG. 13 shows the upper portion 30' of the frame arms 30 compacted by being pivoted downward in a transport condition. The upper portion 30' is pivotedly attached to the vertically extending lower first frame arm portion which is directly supported by the lower frame 20.

A pair of pivots 31 is attached to the lower frame 20 in some embodiments, e.g., FIG. 1. The pair of pivotable frame arms 30 is shown in FIG. 1 being pivotedly mounted within the lower frame 20 at the pair of pivots 31. In the embodiment of FIG. 11, the pivots 31 are located within the frame arms 30 and allow pivoting of the upper portion 30' into a transport condition, as shown in FIG. 13.

The pair of frame arms 30 is shown in FIGS. 1 and 11 being upright, e.g., orthogonal, to the lower frame 20. The pair of frame arms 30 is shown in FIGS. 2 and 13 being side-by-side coextensive with the lower frame 20 in the ready for transport condition. In FIG. 2, the frame arms 30 are coextensive and interior to the lower frame, whereas in FIG. 13, the frame arms upper portion 30' are coextensive on top of the lower frame.

The pair of frame arms 30 support a cable sorting threader 50 between the individual frame arms 30 (also referred to as a cable sorting threader workstation 50). The cable sorting threader 50 may be L-shaped in cross section with a vertical section joined to a horizontal section. See FIGS. 1, and 4-5. The L shape provides extra rigidity at the top of the frame arms 30 as well as providing a supporting/guiding surface for cable meter 80. In the embodiment of FIG. 11, the upper portion 30' of the frame arms 30 support the cable sorting threader 50.

The cable sorting threader 50 also includes a fin retaining plate 53 and a retaining element 54 to press the plate 53 against the vertical section, e.g., a clamp. FIGS. 1 and 15 show a fin mounted against threader 50.

In FIG. 11, the slot 55 receives an auxiliary threader bar 50' that includes further holes 52' aligned with corresponding holes 52 of the threader 50. Although only a single row of holes 52' are shown, a double row of holes 52' may also be provided.

Figure 6:
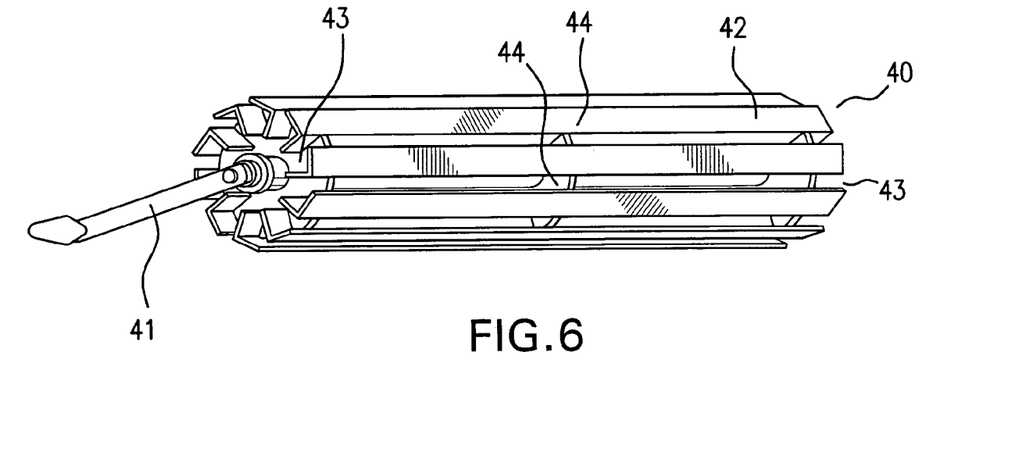
FIG. 6 illustrates a revolvable tape segmenting spindle.
Figure 7:
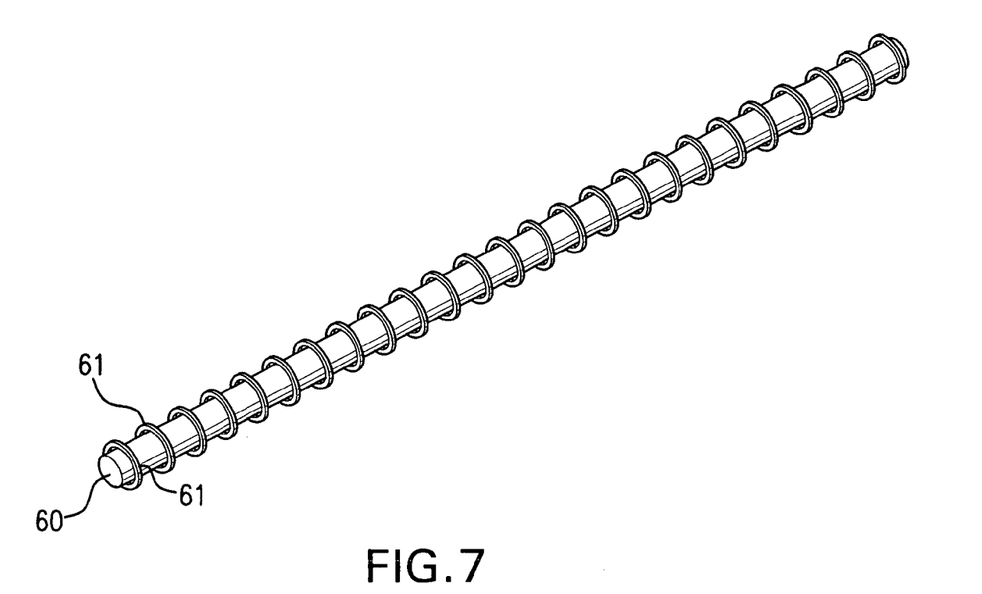
FIG. 7 illustrates a tape rolls support rod.

Below the cable sorting threader 50, the pair of frame arms 30 also supports a revolvable tape segmenting spindle 40 and a tape rolls support rod 60. The tape rolls support rod 60 may be supported by open-U receiving elements 64. FIG. 6 shows the revolvable tape segmenting spindle 40 in more detail. FIG. 7 shows the tape rolls support rod 60 in more detail. The tape rolls support rod 60 may include separating elements 61 which space apart adjacent tape rolls.

Turning to the embodiment of FIG. 1, the lower frame 20 comprises a longitudinal first outside channel element 21 connected at a first end, by a base channel element 23, to a first end of a longitudinal second outside channel element 22.

A second end of the first outside channel element 21 is connected, by a hinge 26, to a first end of a longitudinal first inside channel element 24. A second end of the second outside channel element 22 is connected, by another hinge 26, to a first end of a longitudinal second inside channel element 25. The inside channel elements serve as lower frame re-locatable side panels that extend by relocation from an inner position to an extended outer position. Compare FIG. 1 to FIG. 9.

As indicated by arrows A and B in FIG. 1, the first and second inside channel elements extend by pivoting open to an extended position with the inside and outside channel elements being in-line (lengthwise) longitudinally aligned. The extended position increases the longitudinally length of the tool base which provides additional stability and mounting length to support cable axles with mounted cable reels.

The pair of outside channel elements 21, 22 are pivotedly connected to the pair of inside elements 24, 25 by the hinges 26, the pair of inside channel elements 24, 25 are thus pivotable to from i) a compacted (e.g., folded) position (FIG. 1) to an ii) extended position (FIG. 9). In the compacted position (FIG. 1) the length of each of the inside elements 24, 25 is parallel adjacent to the corresponding length of each of the outside channel elements 21, 22. The inside elements 24, 25 may be of any suitable length and need not extend the entire length of the outside elements 21, 22.

This compacted position may serve as a limited-space use configuration for using the took in cramped (limited) space conditions.

In the extended position (FIG. 9) the inside elements 24, 25 are lengthwise longitudinally aligned with the outside elements 21, 22.

The pair of pivots 31 is attached to the pair of the outside elements 21, 22, via spacers 35, as shown in FIG. 1.

As shown in FIGS. 1-3, the first and second outside channel elements 21, 22 and the base channel element 23 have open web portions of the respective channels facing outward. The tool 10 is, however, not so limited.

An alternative lower frame 20 is shown in FIGS. 11-15.

The lower frame 20, of the FIG. 1 embodiment, further comprises a removable staging bar 27. In FIG. 1, each end of the staging bar 27 is removably attached to one of the inner and outer channel elements, i.e., to one of elements 21 and 24 at a first end and, to one of elements 22 and 25 at a second end. The staging bar 27 is attached using conventional attachment parts 28, such as wing nuts secured to a threaded post or bolt.

Removal of the staging bar 27 facilitates relocating the inner channel elements 24, 25 from the compacted position into the extended position. Once in the extended position, the staging bar 27 can be reattached to the free ends of the extended inner channel elements 24, 25 as shown in FIG. 9. The staging bar 27 may also be comprised of a channel element. When the staging bar 27 is reattached at the ends of the extended inner channel elements 24 25, the upward facing channel serves as a support for resting plural cable reels 91. The thus-rested cable reels are self-aligned and ready to be mounted on a single cable axle 90 (rod).

As shown in FIGS. 1-3, the first and second inside channel elements 24, 25 have the open web portions of the respective channels facing inward, in the positions illustrated. However, when the inside channel elements 24, 25 are moved into the extended position, the open web portions of the channels face outward. See FIG. 9 illustrated inside channel element 24 in the extended position with the open web portion of the channel facing outward. The tool 10, however, is not so limited. Nor is the lower frame limited to use of channel elements. Suitable elements of a non-channel type may be substituted for channel elements.

The holes 29, on the upper face of the inside and outside channels serve as mounting points for axle saddles 34 that cradle the cable axles 90 in turn mounting plural cable reels 91. For clarity, FIG. 1 shows only a single saddle 34; however, a saddle 34 is provided for each end of each cable axle. The axle saddles 34 securely support the cable axles so that the cable axles and the cable reels remain in a fixed position during the subsequent cable pulls. The lower frame 20, in the extended position, has sufficient length to support plural cables axles which in turn can support a flexible number of cable reels and boxes. One embodiment supports 48 cable reels. Thus, in that embodiment, cable pulls can be accommodated where 48 cables can be pulled at one time.

An alternative lower frame 20 is shown in FIGS. 11-15.

Each of the pair of frame arms 30 is attached to the lower frame 20. In the embodiment of FIG. 11, the frame arms 30 are attached to the lower frame 20 via cross element 37 and elements 38. In the embodiment of FIG. 1, the frame arms are attached to the lower frame via the intermediate spacer 35.

The spacer 35 allows each of the frame arms 30 to locate adjacent one of the inside channel elements 24, 25 when the pair of frame arms 30 (as shown in FIG. 2) is positioned coextensive with the lower frame 20, i.e., in the ready for transport condition.

The pair of frame arms 30 pivot at pivots 31 and are each retained in the position shown in FIG. 1 by engagement of a retainer 32 at the position shown. Releasing retainers 32 allows the craftsman to locate the pair of frame arms 30 from the in use condition (FIG. 1) to the ready for transport condition (FIGS. 2-3) by pivoting in the direction of arrow C shown in FIG. 1. Thus, the retainers 32 engaging the pair of frame arms 30 to the lower frame 20 maintains the pair of frame arms 30 in a stationary position. In FIG. 11, the upper portions 30' are retained via a notch and pin arrangement 39.

The retainers 32 engages alternative sets of aligned openings 33 in the pair of frame arms 30 and in the lower frame 20 to maintain the pair of frame arms 30 in a stationary position. In a first set of the aligned openings 33 the engaged retainers 32 maintain the pair of frame arms 30 orthogonal to the lower frame 20 (in the ready for use condition), and in a second set of the aligned openings 33 the engaged retainers 32 maintain the pair of frame arms 30 coextensive with the lower frame 20 (in the ready for transport condition).

The retainers 32 are disengaged from the aligned openings to allow pivoting of the pair of frame arms 30 from one position to another position.

When the tool 10 is in the ready for transport condition, the retainers 32 engage in aligned openings 33 of the lower frame and the pair of frame arms 30 to secure the pair of frame arms 30 to the lower frame 20 as shown in FIG. 3.

The tool 10, in the ready for transport condition, provides a compacted unit with easy mobility around a job site utilizing the wheels 70. Also, large embodiments of the tool 10, when in the ready for transport condition, continue to be mobile and fit into small spaces such as trucks and elevators. As illustrated, the tool 10 is compact enough to be moved by a single craftsman.

Ideally, when information signal cable (e.g., cat 5, cat 6, copper, and fiber-optic) is pulled, the cable is perfectly flat without any twisting. However, this is not how cable acts when removed from a cable reel or from a cable box due to the cable retaining the coiled shape memorized from being reeled or boxed. Thus, in the prior art, as cable is pulled from a cable reel or from a cable box, the cable includes cable reel memory (also known as cable set) which has the effect of twisting or coiling the cable.

The present invention removes this cable reel memory. Advantageously much of the cable reel memory is removed, more advantageously; substantially all the cable reel memory is removed.

The cable sorting threader 50 comprises cable reel memory reducing holes 52 provided in the vertical section. Cables 92 are passed through each of the holes 52 of the cable sorting threader 50. See FIGS. 1 and 9. The cable sorting threader 50 is positioned relative to the cable reels/boxes and these holes 52 are sized to allow the craftsman to pull the cable through the holes and concurrently remove the cable reel memory present in the cable as the cable comes off the reel or out of the box. The craftsman pulling the cable through the cable sorting threader advantageously removes sufficient cable reel memory that the amount of cable required is reduced as compared to not pulling the cable through the cable sorting threader and the cables pulled lay flatter than they otherwise would. Thus, the holes 52 are sized to passed information signal cable and concurrently remove sufficient cable reel memory present in the cable as the cable comes off a reel or out of a box to increase an effective length of the cable passed through the holes by at least 10% as compared to the same cable pulled from the reel or out of the box but not passed through the holes 52.

In the prior art, pulling cable often resulted in knots and/or kinks within the pulled cable. These knots and kinks narrow and/or weaken the cable jacketing. This is a particular tricky problem as the pulled cable may initially test satisfactory, but may later fail. The later failing results in the cable being unsatisfactory for its intended use. When cable fails, the failed cable must be repaired or replaced.

Pulling the cable through the cable sorting threader eliminates cable with knots and kinks from being placed in service since the holes 52 are sized to block any knot or kink from passing through the holes 52.

Figure 4:
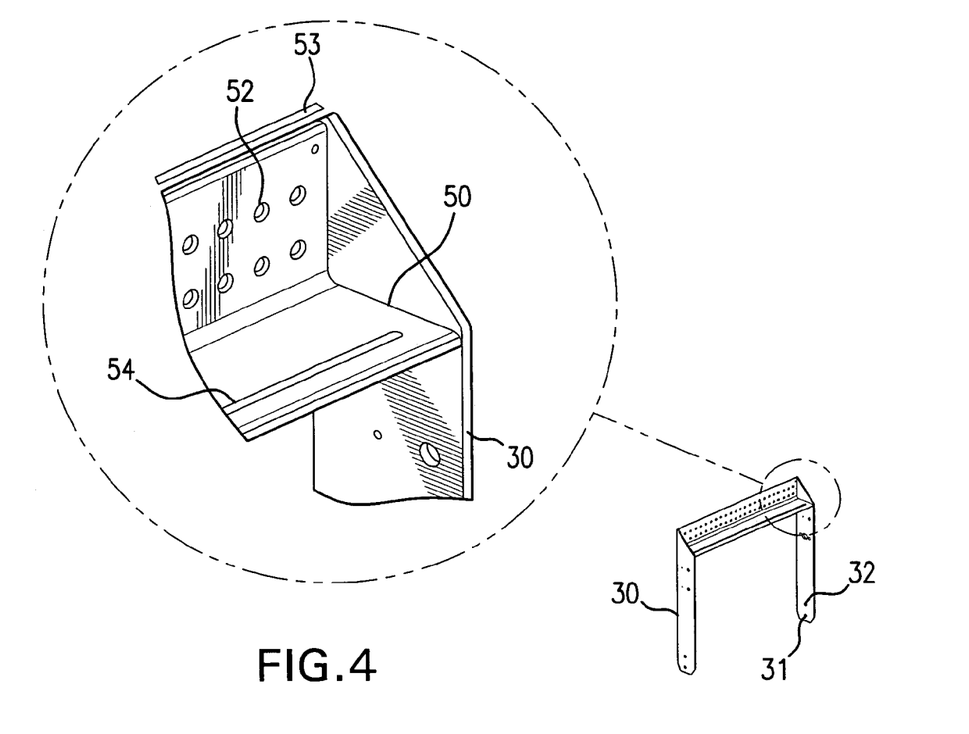
FIGS. 4-5 illustrate two views of the frame arms and cable sorting threader with enlarged details of the cable sorting threader connecting to the frame arms.
Figure 5:
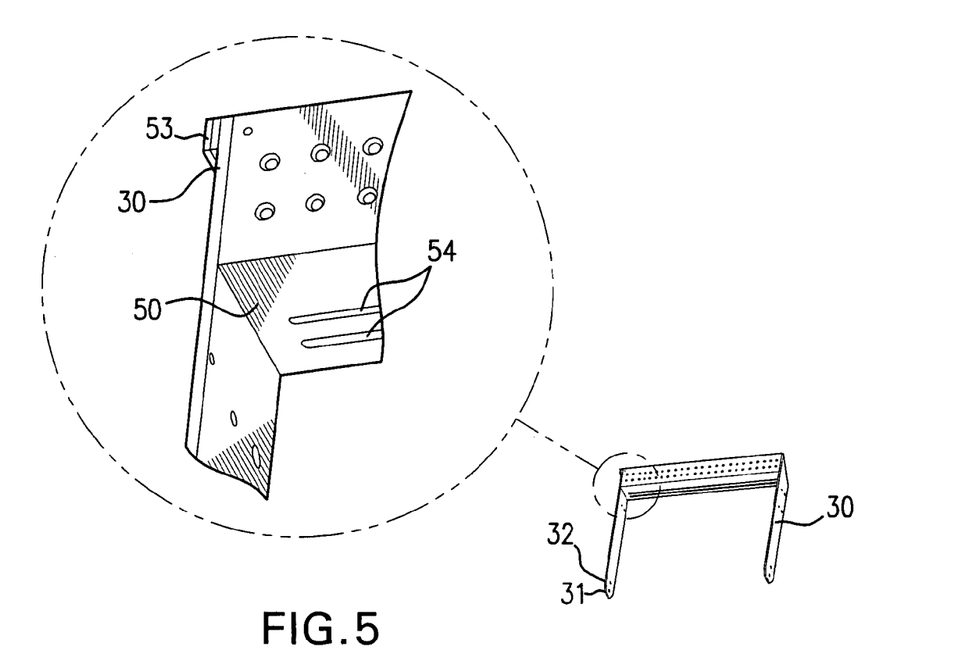

Cable meter 80 mounts on the horizontal section of the cable sorting threader 50 and travels along a longitudinal groove(s) 54 of the horizontal section. See FIGS. 4-5 illustrating the groove(s) and FIG. 1 illustrating the meter 80 mounted on the cable sorting threader 50. Plural meters may also be mounted on the horizontal section.

Tape rolls support rod 60 mounts plural tape rolls, in a side by side manner, across the width of the pair of frame arms 30. As shown in FIG. 7, the tape rolls support rod 60 may include separating elements 61 (e.g., o-rings) which space apart adjacent tape rolls.

Tape segmenting spindle 40 revolves by user operation of a detachable crank handle 41. The crank handle may act on the segmenting spindle through a ratchet 49 (or alternatively a clutch). Use of the ratchet assures that the spindle is moved forward in a specific direction upon turning the handle and assures that there is no backward movement.

Importantly, the tape segmenting spindle 40 is comprised of parallel spaced apart fins 42. The fins 42 run in a longitudinal direction to form a cylindrical shape across the pair of frame arms 30. The fins 42 detach from spindle 40 and a detached fin 42 may rest on an uppermost edge of the cable sorting threader 50.

As shown in FIG. 6, the fins 42 are non-planar and may be L-shaped.

The tape segmenting spindle 40, in large embodiments, also comprises three center disk assemblies 43, 44, i.e., two outer disk assemblies 43 and a middle disk assembly 44. Smaller embodiments may have fewer than three total disk assemblies.

Each of the disk assemblies comprises radial slots 45. Some of the slots 45 include a fin retaining clip 46 fixed adjacent the slot 45 by, e.g., by hardware elements 47, to a substrate disk 48. In some embodiments only slots of the middle disk assembly have the clips.

Each fin 42 is insertable into the aligned slots 45 of the three center disk assemblies 43, 44. The clips 46 of the two outer disk assemblies 43 retain the fin 42 until the craftsman extracts the fin 42 from the slots 45, e.g., after the tape segments have been affixed to the fin 42 and cut to length.

The length of the cut tapes is therefore determined by the fin spacing, the fin spacing being in turn determined by slot spacing on the perimeter of the disks 48.

FIGS. 1-3 illustrate wheels 70 attached to the lower frame 20 in two alternative locations. Casters can substitute for the wheels 70. The wheel bracket 71 is secured to the base channel element 33 by hardware 72 that may include wing nuts. This allows the wheel bracket 71 to be user detachable from the base channel element 23.

See in FIG. 11 that the wheel support brackets 71 are connected to lower frame 20. The two wheel support brackets extending traverse the lower frame. Each of the wheel support brackets support a pair of wheels 70. The wheels are located outboard (outside) of the lower frame and carry the lower frame during frame movement.

One embodiment of the inventive structured cabling tool 10 includes the lower frame 20 (as shown in FIG. 9) extended in the ready for use condition and (as shown in FIG. 2) compacted (here folded) in the ready for transport condition.

As illustrated by FIG. 1, the frame arms 30 are pivotably supported within the lower frame 20. As discussed above, the frame arms 20 are fixable in a first position upright orthogonal to the extended lower frame (i.e., when in the ready for use condition as shown in FIG. 9 and as shown in FIG. 1) and a second position compacted coextensive with the folded lower frame (i.e., in the ready for transport condition as shown in FIG. 2).

As shown in FIG. 1, a cable sorting threader 50 is supported between the frame arms 30. A revolvable tape segmenting spindle 40 is also supported by the frame arms 30 and is located below the cable sorting threader 50.

The lower frame 20 has been illustrated above with the outside channel members being hinged to the inside channel members, but the invention is not so limited. The lower frame is reconfigurable from/to a compacted position to/from an extended position.

Figure 10:
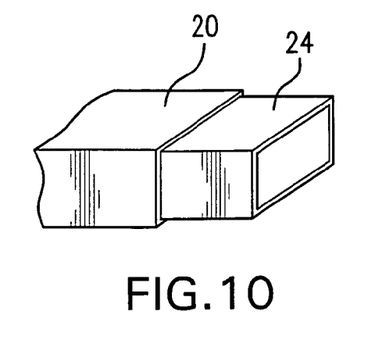
FIG. 10 illustrates an exemplary element-inside-element arrangement.

Alternative constructions of the lower frame which accomplish this reconfiguration are within the scope of the invention. For example, FIG. 10 illustrates an element-inside-element alternative. This construction is useful for both the lower frame and for the saddles 34. FIG. 11 is another alternative which may also utilize the element-inside-element feature for the lower frame and the saddles.

In the case of the saddles 34, an element-inside-element construction allows the saddles to be raised from the lower frame and thus to position the cable axles 90 higher off the floor. This increases the usefulness of the tool in that larger size reels may be accommodated.

In the case of the lower frame 20, the outside channel members 21, 22 house the inside channel members 24, 25 in the compacted position (with the members being one inside another coextensive) whereas in the extended position, the inside members extend from the outside members (with the members being in-line longitudinally aligned).

In the embodiment of FIG. 11, there are two parallel horizontal frame elements making up the lower frame. There are also saddle uprights 93 supported by the two frame elements of the lower frame 20. In FIG. 11, the saddle uprights 93 are mounted with a lower end of each upright being located between the two frame elements. The saddle uprights 93 are secured to the lower frame 20 at mounting points 29'.

In FIGS. 14-15, the saddle uprights 93 are slidably mounted on the lower frame 20, bolts being illustrated to tighten the saddle uprights in position. Being able to reposition the saddle uprights 93 allows accommodation of different size cable reels. Thus, the uprights 93 may be permanently attached to the lower frame at the mounting points 29', e.g., by welding (FIG. 11), or may be removably, mechanically attached, e.g., by bolts (See FIGS. 14-15).

Each saddle upright 93 may be extendable by, e.g., including an inside element 94 and an outside element 95, from a first compacted height to a second height or to one of plural further heights so as to be reconfigured from a compacted ready-for-transport condition to an extended ready-for-use condition.

The cable axles 90 are supported by the uprights 93, and may be permanently secured thereto. See support holes 87 in FIG. 11 and, alternatively, supports 88 in FIG. 13 that serve as cable axle supports. As shown in FIG. 13, the uprights may be collapsible to reduce the height of the device 10 when in the transport condition and thus further compact the tool.

Cables 93 supported on lower cable axle 90-1 of a forward support 93-1 may by at a disadvantageous angle with respect to the holes 52 of the threader 50 such that excessive bending and cable set of the cable 92 may occur if the cable were routed directly through the holes 52. Advantageously, as shown in FIG. 14, a pulley support upright 97 vertically extends from the lower frame 20 to support pulleys 96. The pulleys 96 are provided to allow first rearward travel of the cable and then forward redirection of the cable thereby overcoming the disadvantageous angle and reducing cable set. As shown, plural pulleys 96 may be mounted on upright 97 and used together to provide a vertical displacement of the cable.

The pulleys 96 are mounted on the pulley support upright with the pulleys positioned to redirect cable i) withdrawn, from a cable reel mounted on a cable axle, in a first direction away from the cable sorting threader to ii) a second direction toward the cable sorting threader. Although the pulleys 96 are shown on a pulley upright 97 mounted on bracket 71, alternative arrangements are suitable, e.g., mounting pulleys on axle 90-2 of upright 93-5. Pulley upright 97 may be mounted in alternative locations.

Use of the Tool

The tool 10 is transported to the job location and placed with the lower frame 20 flat against the floor.

In the FIG. 1 embodiment, the staging bar 27 is removed and the lower frame changed from the folded position to the extended position, i.e., from that shown in FIG. 1 to that shown in FIG. 9. Advantageously, the FIG. 11 embodiment avoids the use of the staging bar.

The staging bar 27 is attached to the end of extended lower frame 20 (see FIG. 9). Plural cable reels are placed on staging bar 27 to accept a single cable axle. Each thus-configured cable axle, with mounted cable reels, is then repositioned to be supported by a pair of opposing axle saddles 34 attached on the lower frame 20. In one embodiment, sufficient cable axles are thus supported on the lower frame 20 that up to 48 cable reels can be supported for simultaneous pulling of the 48 cables. Cable can also be pulled directly from cable boxes placed proximity the lower frame 20 and routed through the cable sorting threader 50. In the FIG. 11 embodiment, the uprights 93 are installed/extended and the axles 90 put in place in order to receive the cable reels 91.

Figure 8:
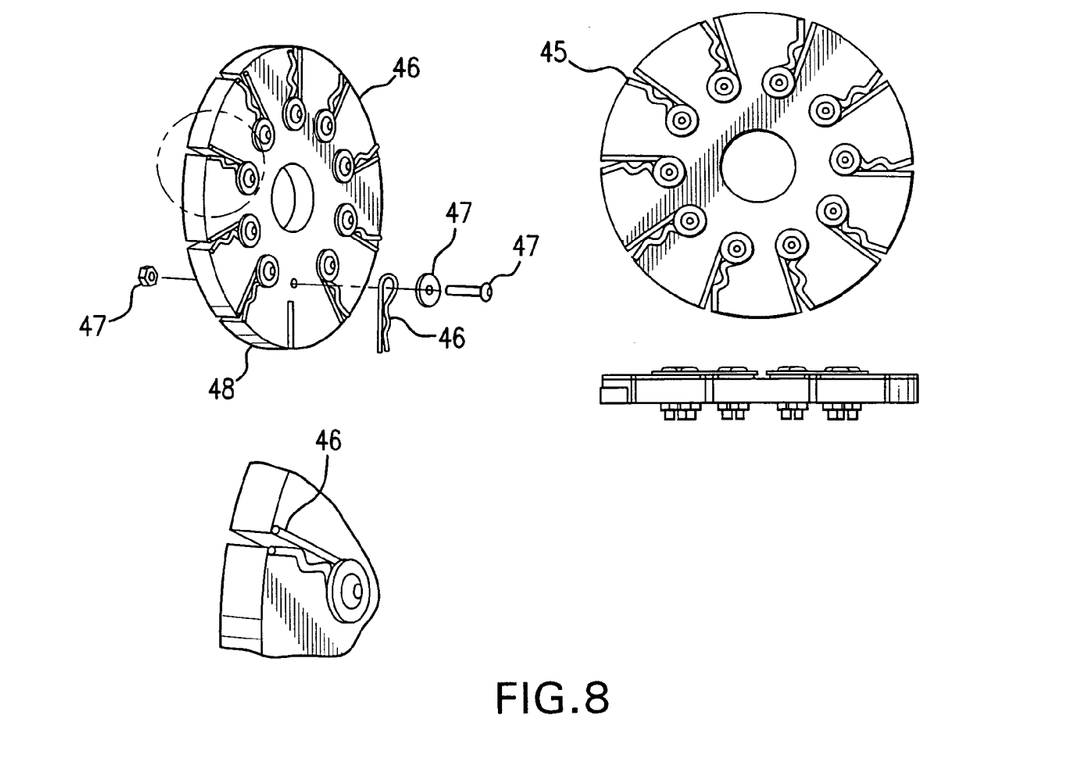
FIG. 8 illustrates the out disk assembly of the tape segmenting spindle.

Cables to be pulled are individually inserted into individual ones of the holes 52 of the cable sorting threader 50 (See FIG. 8). At the start of each cable pull, the individual cables are grouped and banded together.

Rolls of color-coded tape are mounted on the tape rolls support rod 60 and the tape rolls support rod 60 attached to the frame arms 30. The tape rolls, supported on the tape rolls support rod 60, are thus positioned directly above the tape segmenting spindle 40 and below the holes 52. Tape pulled from each tape roll is pressed against a common one of the fins 42. The tape rolls support rod 60 holds sufficient tape rolls to allow for two pieces of tape to be cut in a single operation during most cable pulls.

The vertical alignment of the holes 52, the tape rolls, and the fins 42 provide that after cutting the tape and relocating the fin, to be secured within the fin retaining plate 53 by retaining element 54, the cut pieces of tape are aligned over the holes corresponding to the appropriate cables for those cut pieces of tape.

Turning crank handle 41 further deploys tape onto the fins 42 of the tape segmenting spindle 40. The direction and amount of rotational movement is set by the ratchet 49. Advantageously, the number of positions of rotation set by the ratchet equals the number of fins on the spindle 40.

When the spindle 40 has been operated to complete acceptance of appropriate lengths of tape as transferred tape segments on plural ones of the fins 42, the tape segments can be easily cut to uniform lengths by using an edge of each fin 42 as a cutting guide. Thereafter, a first fin 42 is detached from the retaining clips 46 and secured on the uppermost edge of the cable sorting threader 50 by fitting the fin between the fin retaining plate 53 and the vertical section of the threader. Operation of the retaining element 54 presses the plate 53 against the vertical section to secure the fin. This positions the first fin 42 (with the two cut tape segments per hole) such that the craftsman using the tool 10 can quickly write an identification code on each of the tape segments without moving from the work area and without risk of misidentifying the cabling. The thus-marked tape segments serve as beginning-of-pull and end-of-pull tape segments and can be correctly transferred to the beginning and terminal ends of the individual cables being pulled. In this way, both the beginning and terminal ends of the cables are assured to be correctly identified.

At the end of a first cable pull, a next second fin 42 can be used to form tape segments for a second cable pull. After transferring the second fin 42 to the uppermost edge of the cable sorting threader 50, these new tape segments can be transferred to the second cables being pulled. In this way, the labels are consistent as to length and appearance from the first cable set being pulled to the second cable set pulled to further cable sets pulled. Also, as noted above, the vertical alignment of the holes 52, the tape rolls, and the fins 42 provide that after cutting the tape and relocating the fin, to be secured within the fin retaining plate 53 by retaining element 54, the cut pieces of tape (labels) are aligned over the holes corresponding to the appropriate cables for those labels. This promotes accuracy and avoids errors. The cable meter 80 is mounted into place on cable sorting threader 50 to provide point of use, real time measurement of cable usage as cable is pulled from the tool 10. This point of use measurement assures cables are cut to the exact length needed and waste is avoided. Even when staggered lengths are quickly measured out and cut, the cable meter 80 provides accurate measurement. As noted above, plural cable meters may be mounted to the threader 50 when desired.

The above embodiments are provided as examples of the invention and are not extended to be exclusive applications of the invention. As noted, the invention has application to a variety of cable uses and is easily reconfigurable for different work and space conditions.

The invention claimed is:

1. A cabling tool, comprising:
    a cable sorting threader with spaced apart holes sized to pass individual cables therethrough; and
    a cable labeling system mountable against the cable sorting threader,
    the cable labeling system configured and arranged
    i) to align two adjacent cable labels vertically over each hole and vertically over a corresponding cable passing through each hole, and
    ii) to allow correct transfer of a first label of the two cable labels to a beginning end of the corresponding cable located vertically below the first label and transfer of a second label of the two cable labels to a terminal end of the corresponding cable located vertically below the second label, the thus-applied first and second labels serving as beginning-of-pull and end-of-pull labels to correctly identify the beginning and terminal ends of the individual cables being pulled, further comprising:
    a pair of frame arms (30, 30') supporting the cable sorting threader (50); and
    an overall lower frame (20) providing a base to support cable axles (90) carrying cable, the frame arms (30, 30') supported by the lower frame, the frame arms fixable upright orthogonal to the lower frame in a tool ready for use condition and coextensive with the lower frame in a tool ready for transport condition, the tool being extended, at least in a vertical direction, in the ready for use condition and compacted, at least in the vertical direction, in the ready for transport condition, wherein,
    the overall lower frame (20) comprises i) a removable staging bar, ii) a pair of outside elements (21, 22), and iii) a pair of inside elements, the pair of outside elements connected to the pair of inside elements, the pair of inside elements relocatable from i) a horizontally compacted position with a length of each of the inside elements parallel adjacent to a corresponding length of each of the outside elements to ii) an extended horizontal position with the inside elements lengthwise longitudinally aligned with the outside elements,
    the frame arms (30) are mounted within the lower frame, the frame arms extending upright with respect to the lower frame in a ready for use condition, the pair of frame arms being coextensive with the lower frame in a ready for transport condition, the staging bar connected, at a first position, to the pair of outside elements in the ready for transport condition, the staging bar connected, at a second position, to the pair of inside elements in the ready for use condition with the lower frame configured to support plural cable axles with each of the plural cable axles adjacently mounting plural cable reels, and
    the tool is reconfigurable from the ready for transport condition to the ready for use condition by i) relocation of the staging bar from the first position to the second position, ii) relocation of said inner elements from the compacted position to the extended position, and iii) moving the pair of frame arms from being coextensive with the lower frame to being orthogonal to the lower frame.

2. The tool of claim 1, wherein,
    the cable labeling system includes i) a removable tape rolls support rod (60) supported by a pair of frame arms, the tape rolls support rod for adjacently mounting plural tape rolls, tape on the tape rolls providing the cable labels; and ii) a revolvable tape segmenting spindle (40) supported by the pair of frame arms and located adjacent the tape rolls support rod, and the tape rolls support rod comprises separating elements (61) to space apart the adjacent tape rolls.

3. The tool of claim 1, wherein,
    the pair of outside elements and the pair of inside elements are outside channel elements and inside channel elements respectively,
    a first of the outside channel elements is connected at a first end, by a base channel element (23), to a first end of a second of the outside channel elements,
    a second end of the first outside channel element is pivotedly connected by a first hinge (26) to a first end of a first of the inside channel elements,
    a second end of the second outside channel element is pivotedly connected by a second hinge (26) to a first end of a second of the inside channel elements, and
    the inside channel elements, via the first and second hinges, are relocateable from the folded position to the extended position with the inside channel elements lengthwise longitudinally aligned with the outside channel elements.

4. The tool of claim 3, wherein,
    the first and second outside channel elements have open web portions of the respective channels facing outward, and
    the staging bar, connected at a second position, includes an upwardly facing web portion sized to vertically support plural cable reels self-aligned and ready to be mounted on a single cable axle, in the folded position, the first and second inside channel elements have open web portions facing inward toward each other, and in the extended position, the open web portions of the inside channel elements face outward.

5. A cabling tool, comprising:

a cable sorting threader with spaced apart holes sized to pass individual cables therethrough; and a cable labeling system mountable against the cable sorting threader, the cable labeling system configured and arranged i) to align two adjacent cable labels vertically over each hole and vertically over a corresponding cable passing through each hole, and ii) to allow correct transfer of a first label of the two cable labels to a beginning end of the corresponding cable located vertically below the first label and transfer of a second label of the two cable labels to a terminal end of the corresponding cable located vertically below the second label, the thus-applied first and second labels serving as beginning-of-pull and end-of-pull labels to correctly identify the beginning and terminal ends of the individual cables being pulled, further comprising:

a pair of frame arms (30, 30') supporting the cable sorting threader at a top end of the pair of frame arms, wherein, the cable sorting threader includes a vertical section, the holes are located in the vertical section, and the cable labeling system includes i) a removable tape rolls support rod (60) supported by the pair of frame arms and located below the cable sorting threader, the tape rolls support rod for adjacently mounting plural tape rolls, tape on the tape rolls providing the cable labels, and ii) a revolvable tape segmenting spindle (40) supported by the pair of frame arms and located below the tape rolls support rod.

6. The tool of claim 5, further comprising:

a cable meter (80) mounted on a horizontal section of the cable sorting threader and movable along a longitudinal groove of the horizontal section.

7. The tool of claim 5, wherein, the tape segmenting spindle comprises parallel spaced apart fins (42), the fins running in a longitudinal direction to form a cylindrical shape across the pair of frame arms, each fin located to withdraw tape from the tape rolls during rotation of the spindle and to receive the withdrawn tape during the rotation of the spindle, and the fins detach from the tape segmenting spindle to move to an uppermost edge of the cable sorting threader to transport the received tape, the received tape forming the cable labels.

8. The tool of claim 5, further comprising:

an auxillary threader bar (50'), spaced apart from the cable sorting threader, with further holes (52') to pass the pulled cables through, wherein, the further holes of the threader bar are aligned with holes of the cable sorting threader.

9. The cabling tool of claim 5, wherein, the cable sorting threader is L-shaped in cross section with the vertical section joined to a horizontal section.

10. A cabling tool, comprising:

a cable sorting threader with spaced apart holes sized to pass individual cables therethrough; and a cable labeling system mountable against the cable sorting threader, the cable labeling system configured and arranged i) to align two adjacent cable labels vertically over each hole and vertically over a corresponding cable passing through each hole, and ii) to allow correct transfer of a first label of the two cable labels to a beginning end of the corresponding cable located vertically below the first label and transfer of a second label of the two cable labels to a terminal end of the corresponding cable located vertically below the second label, the thus-applied first and second labels serving as beginning-of-pull and end-of-pull labels to correctly identify the beginning and terminal ends of the individual cables being pulled, further comprising:

a pair of frame arms (30, 30');

two parallel horizontal frame elements making up a lower frame;

uprights (93) attached to each of the two frame elements of the lower frame (20), plural cable axle supports (87, 88) located on each upright; and a cable axle (90) configured to supporting cable, wherein, the uprights (93) are extendable from a first height to plural further heights so that the uprights are reconfigurable between a compacted ready-for-transport condition and an extended ready-for-use condition.

11. The tool of claim 10, further comprising:

a pulley support upright (97) vertically extending from the lower frame; and a pulley mounted on the pulley support upright, the pulley positioned to redirect cable withdrawn in a first direction away from the cable sorting threader to a second direction toward the cable sorting threader.

12. A cabling tool, comprising:

a cable sorting threader with spaced apart holes sized to pass individual cables therethrough; and a cable labeling system mountable against the cable sorting threader, the cable labeling system configured and arranged i) to align two adjacent cable labels vertically over each hole and vertically over a corresponding cable passing through each hole, and ii) to allow correct transfer of a first label of the two cable labels to a beginning end of the corresponding cable located vertically below the first label and transfer of a second label of the two cable labels to a terminal end of the corresponding cable located vertically below the second label, the thus-applied first and second labels serving as beginning-of-pull and end-of-pull labels to correctly identify the beginning and terminal ends of the individual cables being pulled, wherein, the cable labeling system includes:

i) a fin retaining element (53) located adjacent the cable sorting threader;

ii) a removable tape rolls support rod (60) supported by a pair of frame arms and located below the cable sorting threader, the tape rolls support rod for adjacently mounting plural tape rolls, tape on the tape rolls providing the cable labels; and iii) a revolvable tape segmenting spindle (40) supported by the pair of frame arms and located below the tape rolls support rod, the tape segmenting spindle comprising parallel spaced apart fins (42), the fins running in a longitudinal direction to form a cylindrical shape across the pair of frame arms, the fins detaching from the tape segmenting spindle and insertable between the fin retaining plate and the cable sorting threader.

13. The tool of claim 12, adapted for executing the steps of:
threading the cable to the spaced apart holes within the cable sorting threader with one cable passing through each hole;
with the cable labeling system, segmenting tape to form a set of the two adjacent cable labels for each cable passing through the holes;
placing the first label of each two adjacent cable labels on the beginning ends of the cables, one first label being placed on each cable;
pulling the cables through a building to a destination location; and
after pulling the cables to the destination location, placing the second labels on the terminal ends of the cables, one second label being placed on each cable, wherein,
the set of cable labels are formed and placed by the steps of
i) placing tape from each of the tape rolls located on the tape rolls support rod (60) onto one of the fins,
ii) rotating the tape segmenting spindle so that the rotation of the tape segmenting spindle withdraws tape from the tape rolls and covers the fin with the tape withdrawn from the tape rolls,
iii) cutting the tape covering the fin to segment the tape and form, at the same time, both of the adjacent first and second labels,
iv) detaching the fin from the tape segmenting spindle and mounting the fin with the fin retaining element, and
v) taking labels from the fin and placing one first label on a corresponding one of the pulled cables at a hole located in vertical alignment with a location of the label on the fin, wherein, in said step of iii) cutting the tape covering the fin to segment the tape and form the labels of both of the first and second label sets, each label of the first label set is located immediately adjacent a label of the second label set.

14. A cabling tool to systematically organize, measure, identify, and install multiple cables from a cabling pulling location to multiple locations within a building through the co-ordination and identification of the multiple cables using a label system identifies individual cables being installed, comprising:
A) an overall horizontally-oriented lower frame (20);
B) cable axles (90) supported on the lower frame;
C) cable mounted on the cable axles (90);
D) a front portion of the cabling tool configured for withdrawing a cable (92) from one of the mounted reels (90) and routing the cable to through the front portion of the cabling tool;
E) a first hole (52) located in a cable sorting threader (50) located at a top part of the front portion of the cabling tool for pulling the cable through;
F) a label fin mountable in a fin retaining plate (53) and engaging a retaining element (54) to press the plate against the threader (50), plural labels being located on the label fin with two adjacent cable labels being vertically aligned over the hole and vertically over the cable passing through the hole;
G) a cable meter (80) to measure a length of the cable pulled through the hole.

15. The tool of claim 14, further comprising:
a second hole (52') located in an auxiliary threader bar (50') of the threader, the first and second holes being aligned.

16. The tool of claim 14, comprising:
a revolvable tape segmenting spindle (40), located below the cable sorting threader (50) and supported by a pair of frame arms, the spindle revolvable to transfer tape from tape rolls onto the label fin, and to allow cutting the transferred tape to define the plural labels.

17. The tool of claim 14, comprising:
a revolvable tape segmenting spindle (40), located below the cable sorting threader (50) and supported by a pair of frame arms, operable to transfer tape from tape rolls onto the label fin, wherein,
the tape segmenting spindle revolves by user operation of a crank handle,
the label fin is one of plural L-shaped and parallel spaced apart fins (42) removably secured to slots within the tape segmenting spindle, the plural run in a longitudinal direction to form a cylindrical shape, and
an edge of a width of one face of the fin defines a cutting edge of the labels; and
cutting along the edge of the width the transferred tape to define the plural labels, wherein a length of the cut tape is determined by the fin spacing.

18. A cabling tool (10), comprising:
an overall horizontally-oriented lower frame (20) providing a base supporting cable axles (90);
a pair of frame arms (30, 30') supported by the lower frame, the frame arms fixable upright orthogonal to the lower frame in a tool ready for use condition and coextensive horizontally with the lower frame in a tool ready for transport condition; and
a cable sorting threader (50) supported by the frame arms and located between the frame arms;
the tool being extended, at least in a vertical direction, in a ready for use condition and compacted, at least in the vertical direction, in a ready for transport condition, wherein,
the overall lower frame (20) comprises i) a staging bar, ii) a pair of outside elements (21, 22), and iii) a pair of inside elements,
the pair of outside elements connected to the pair of inside elements, the pair of inside elements relocatable from i) a horizontally compacted position with a length of each of the inside elements parallel adjacent to a corresponding length of each of the outside elements to ii) an extended horizontal position with the inside elements lengthwise longitudinally aligned with the outside elements;
the pair of frame arms (30) are mounted within the lower frame,
the pair of frame arms being extended upright with respect to the lower frame in a ready for use condition,
the pair of frame arms being coextensive with the lower frame in a ready for transport condition,
the staging bar connected, at a first position, to the pair of outside elements in the ready for transport condition,
the staging bar connected, at a second position, to the pair of inside elements in the ready for use condition with the lower frame configured to support plural cable axles with each of the plural cable axles adjacently mounting plural cable reels; and
the cable sorting threader (50) fixed intermediate each of the pair of frame arms,
wherein the tool is reconfigurable from the ready for transport condition to the ready for use condition by i) relocation of the staging bar from the first position to the second position, ii) relocation of said inner elements from the compactd position to the extended position, and iii) moving the pair of frame arms from being coextensive with the lower frame to being orthogonal to the lower frame.

19. A cabling tool (10), comprising:

an overall horizontally-oriented lower frame (20) providing a base supporting cable axles (90);

a pair of frame arms (30, 30') supported by the lower frame, the frame arms fixable upright orthogonal to the lower frame in a tool ready for use condition and coextensive horizontally with the lower frame in a tool ready for transport condition; and a cable sorting threader (50) supported by the frame arms and located between the frame arms;

the tool being extended, at least in a vertical direction, in a ready for use condition and compacted, at least in the vertical direction, in a ready for transport condition, wherein, the cable sorting threader is at a top vertical end of the pair of frame arms, the cable sorting threader is L-shaped in cross section with a vertical section joined to a horizontal section, and the vertical section comprises holes (52) sized to pass individual cables through respective ones of the holes provided in the vertical section.

* * * * *